US012134705B2

(12) United States Patent
Geiger et al.

(10) Patent No.: US 12,134,705 B2
(45) Date of Patent: Nov. 5, 2024

(54) SCRATCH RESISTANT THERMOSETTING COATING COMPOSITIONS

(71) Applicant: Eastman Chemical Company, Kingsport, TN (US)

(72) Inventors: Philip Jerome Geiger, Kingsport, TN (US); Stacey James Marsh, Church Hill, TN (US); John Evan Boisseau, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 757 days.

(21) Appl. No.: 17/250,991

(22) PCT Filed: Oct. 7, 2019

(86) PCT No.: PCT/US2019/054918
§ 371 (c)(1),
(2) Date: Apr. 8, 2021

(87) PCT Pub. No.: WO2020/076664
PCT Pub. Date: Apr. 16, 2020

(65) Prior Publication Data
US 2021/0380835 A1 Dec. 9, 2021

Related U.S. Application Data

(60) Provisional application No. 62/744,166, filed on Oct. 11, 2018.

(51) Int. Cl.
C09D 167/02 (2006.01)
B05D 7/00 (2006.01)
C08G 63/199 (2006.01)
C08K 5/205 (2006.01)
C08K 5/3492 (2006.01)
C09D 133/08 (2006.01)

(52) U.S. Cl.
CPC ............. C09D 167/02 (2013.01); B05D 7/53 (2013.01); C08G 63/199 (2013.01); C08K 5/205 (2013.01); C08K 5/34922 (2013.01); C09D 133/08 (2013.01); B05D 2425/01 (2013.01)

(58) Field of Classification Search
CPC ........................... C09D 167/02; C09D 133/08; C08K 5/34922; C08K 5/205; B05D 2425/01; B05D 7/53; C08G 63/199
USPC ....................................................... 524/604
See application file for complete search history.

(56) References Cited

U.S. PATENT DOCUMENTS

| | | |
|---|---|---|
| 4,397,989 A | 8/1983 | Adesko |
| 5,474,811 A | 12/1995 | Rehfuss et al. |
| 5,593,785 A | 1/1997 | Mayo et al. |
| 8,163,850 B2 | 4/2012 | Marsh et al. |
| 8,168,721 B2 | 5/2012 | Marsh et al. |
| 9,029,460 B2 | 5/2015 | Marsh et al. |
| 9,029,461 B2 | 5/2015 | Marsh et al. |
| 10,676,565 B2 | 6/2020 | Zhou et al. |
| 2005/0148704 A1 | 7/2005 | Weingartz |
| 2007/0083014 A1 | 4/2007 | Boisseau et al. |
| 2010/0204388 A1 | 8/2010 | Marsh et al. |
| 2014/0242272 A1 | 8/2014 | Sherwood et al. |
| 2014/0296406 A1 | 10/2014 | Marsh et al. |
| 2016/0340471 A1* | 11/2016 | Zhou .................. C09D 167/02 |
| 2017/0275492 A1 | 9/2017 | Zhou et al. |
| 2018/0105640 A1 | 4/2018 | Zhou et al. |
| 2021/0348016 A1 | 11/2021 | Zhou et al. |
| 2021/0348017 A1 | 11/2021 | Marsh et al. |
| 2021/0380835 A1 | 12/2021 | Geiger et al. |
| 2022/0002579 A1 | 1/2022 | Zhou et al. |

FOREIGN PATENT DOCUMENTS

| | | |
|---|---|---|
| WO | WO 2010/090713 A1 | 8/2010 |
| WO | WO 2016-187095 A1 | 11/2016 |
| WO | WO 2020-076661 A1 | 4/2020 |
| WO | WO 2020-076664 A1 | 4/2020 |

OTHER PUBLICATIONS

Notification of Transmittal of the International Search Report and the Written Opinion of the International Searching Authority, or the Declaration date of mailing Dec. 18, 2019 received in International Application No. PCT/US2019/054915.
Notification of Transmittal of the International Search Report and the Written Opinion of the International Searching Authority, or the Declaration date of mailing Jan. 2, 2020 received in International Application No. PCT/US2019/054917.
Notification of Transmittal of the International Search Report and the Written Opinion of the International Searching Authority, or the Declaration date of mailing Jan. 2, 2020 received in International Application No. PCT/US2019/054918.
Co-pending U.S. Appl. No. 17/250,989, filed Apr. 8, 2021; Zhou et al., now US Patent Publication No. 2021-0348016.
Co-pending U.S. Appl. No. 17/250,990, filed Apr. 8, 2021; Marsh et al., now US Patent Publication No. 2021-0348017.
Co-pending U.S. Appl. No. 17/475,890, filed Sep. 15, 2021; Zhou et al., now US Patent Publication No. 2022-0002579.
Resins for Surface Coatings, vol. II, p. 121-210, edited by P. Oldring and G. Hayward, SITA Technology, London, UK, 1987.

(Continued)

Primary Examiner — Vu A Nguyen
(74) Attorney, Agent, or Firm — Judith C. Rawls

(57) ABSTRACT

This invention relates to a carbamate functional thermosetting coating with a composition comprised of a carbamate-functional acrylic and/or polyester polyol and an alkylated melamine-formaldehyde cross linker modified by an aliphatic polyester and an alkylated melamine. The polyester polyol is made of monomers including a 2,4,4-tetraalkylcyclobutane-1,3-diol and an aliphatic diacid. These polyester polyols can be used in blends with hydroxyl-functional or carbamate-functional acrylic resins or serve as the primary film former in a coating formulation.

6 Claims, No Drawings

(56) References Cited

OTHER PUBLICATIONS

Resins for Surface Coatings, vol. III, p. 63-167, edited by P. Oldring and G. Hayward, SITA Technology, London, UK, 1987.
Bayer Material Science, The Chemistry of Polyurethane Coatings, Technical Publication p. 20, 2005.
Wicks et al., Organic Coatings, Science and Technology, 2nd edition, p. 246-257, Wiley-Interscience, New York, 1999.

* cited by examiner

SCRATCH RESISTANT THERMOSETTING COATING COMPOSITIONS

FIELD OF THE INVENTION

This invention relates to a carbamate functional thermosetting coating comprised of an acrylic and polyester polyol and an alkylated melamine-formaldehyde cross linker. The polyester polyol is made of monomers including a 2,4,4-tetraalkylcyclobutane-1,3-diol (TACD) and an aliphatic diacid. Particularly, this invention pertains to curable polyesters containing 2,2,4,4-tetraalkylcyclobutane-1,3-diol (TACD) and high-solids, solvent-borne thermosetting clearcoat compositions prepared from these polyesters. These polyesters can be used in blends with acrylic resins or serve as the primary film former in a coating formulation.

The coating compositions exhibits improved Nano-scratch resistance and abrasion resistance as measured by Tribometer and tabor crock meter compared to the 1K carbamate clearcoats that do not contain TACD.

BACKGROUND OF THE INVENTION

Automotive manufacturers continue to seek improvement in the scratch resistance of coatings applied to vehicles while maintaining low VOC and good chemical resistance. However, increased environmental pressure to reduce VOC by increasing coating solids has forced formulators to adopt lower molecular weight resins, which adversely impacts the scratch resistance and chemical resistance of the coating. Resins and oligomers having carbamate functional groups have been used in a variety of curable coating compositions. Carbamate functional polymers offer many advantages for automotive topcoats, such as outstanding resistance to environmental etching, humidity, and UV exposure. Still the scratch resistance in automotive clear coats has much room for improvement.

There is a need in the coatings industry for automotive clear coats that exhibit improved scratch resistance and chemical resistance.

SUMMARY OF THE INVENTION

The invention is as set forth in the appended claims.

The present invention provides a polyester for use in a clear coating composition comprising:

A. 50-95 weight percent, based on the total weight of (A) and (B), of at least one curable, aliphatic polyester, comprising residues of:
  i. A hydroxyl component, said hydroxyl component comprising the residues of:
    a. from 30 to 80 mole %, based on the total moles of (a) and (b), of 2,2,4,4-tetraalkylcyclobutane-1,3-diol (TACD);
    b. from 20 to 70 mole %, based on the total moles of (a) and (b), of other diols and polyols;
  ii. a diacid component, said diacid component comprising the residues of at least one aliphatic dicarboxylic acid comprising;
    c. 0 to 100 mole %, based on the total moles of the diacids (c) and (d) of an alicyclic dicarboxylic acid; and
    d. 0 to 100 mole %, based on the total moles of the diacids (c) and (d), an acyclic aliphatic diacid;
B. 5 to 50 weight percent, based on the total weight of (A) and (B) a melamine crosslinker;

wherein the curable polyester has a hydroxyl number of 50 to 500 mgKOH/g of resin and an acid number of 0 to 200 mgKOH/g resin.

In another embodiment this invention provides a cured coating comprising:

A. 50-95 weight percent, based on the total weight of (A) and (B), of at least one curable, aliphatic polyester, comprising residues of:
  i. A hydroxyl component, said hydroxyl component comprising the residues of:
    a. from 30 to 80 mole %, based on the total moles of (a) and (b), of 2,2,4,4-tetraalkylcyclobutane-1,3-diol (TACD);
    b. from 20 to 70 mole %, based on the total moles of (a) and (b), of other diols and polyols;
  ii. a diacid component, said diacid component comprising the residues of at least one aliphatic dicarboxylic acid comprising:
    c. 0 to 100 mole %, based on the total moles of the diacids (c) and (d) of an alicyclic dicarboxylic acid;
    d. 0 to 100 mole %, based on the total moles of the diacids (c) and (d), of an acyclic aliphatic diacid;
B. from 5-50 weight percent, based on the total weight of (A) and (B), a melamine crosslinker; and
C. from 35 to 60 weight percent, based on the total weight of the coating composition, of organic solvents;

wherein the curable polyester has a hydroxyl number of 50 to 500 mgKOH/g of resin and an acid number of 0 to 200 mgKOH/g resin; and wherein said cured coating fracture resistance is greater than or equal to 16 mN when tested using a Nano scratch tester with 2 μm Indenter per ASTM D7187-15.

In yet another embodiment, this invention provides a coating composition comprising:

I. a polyester comprising:
  A. 50 to 95 weight percent, based on the total weight of (A) and (B), of at least one curable, aliphatic polyester, comprising residues of:
    i. A hydroxyl component, said hydroxyl component comprising the residues of:
      a. from 30 to 80 mole %, based on the total moles of (a) and (b), of 2,2,4,4-tetraalkylcyclobutane-1,3-diol (TACD);
      b. from 20 to 70 mole %, based on the total moles of (a) and (b), of other diols and polyols;
    ii. a diacid component, said diacid component comprising the residues of at least one aliphatic dicarboxylic acid comprising;
      c. 0 to 100 mole %, based on the total moles of the diacids (c) and (d) of an alicyclic dicarboxylic acid; and
      d. 0 to 100 mole %, based on the total moles of the diacids (c) and (d), of an acyclic aliphatic diacid;
  B. from 5 to 50 weight percent, based on the total weight of (A) and (B) a melamine crosslinker; and
  C. from 35 to 60 weight percent, based on the total weight of the coating composition, of organic solvents;

wherein the curable polyester has a hydroxyl number of 50 to 500 mgKOH/g of resin and an acid number of 0 to 200 mgKOH/g resin; combined with II. a carbamate functional acrylic and/or carbamate functional polyester;

wherein said cured coating fracture resistance is greater than or equal to 16-20 mN when tested using a Nano scratch tester with 2 μm Indenter per ASTM D7187-15,

DETAILED DESCRIPTION

This invention describes a thermosetting coating composition comprised of at least a polyester polyol and a cross linker. The polyester polyol is made of monomers including a 2,4,4-tetraalkylcyclobutane-1,3-diol (TACD) and an alicyclic diacid and/or acyclic diacid in certain ratios. The coating compositions exhibit an improved balance of VOC and scratch resistance over the comparative conventional coatings made from polyols that do not contain TACD or outside of the hydroxyl value range for those materials that do contain TACD. The scratch resistance of the coatings is significantly improved when formulated with polyesters as disclosed herein when added to a carbamate clearcoat the resulting coating exhibits superior scratch resistance, contains low VOC (Volatile Organic Compounds) and maintains good chemical resistance.

Unless otherwise indicated, all numbers expressing quantities of ingredients, properties such as molecular weight, reaction conditions, and so forth used in the specification and claims are to be understood as being modified in all instances by the term." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ diols", is intended to specifically include and disclose $C_1$, $C_2$, $C_3$, $C_4$ and $C_5$ diols.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to a "polyester," a "dicarboxylic acid", a "residue" is synonymous with "at least one" or "one or more" polyesters, dicarboxylic acids, or residues and is thus intended to refer to both a single or plurality of polyesters, dicarboxylic acids, or residues. In addition, references to a composition "comprising", "containing", "having" or "including" "an" ingredient or "a" polyester is intended to include other ingredients or other polyesters, respectively, in addition to the specifically identified ingredient or residue. Accordingly, the terms "containing", "having" or "including" are intended to be synonymous and may be used interchangeably with the term "comprising", meaning that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

The term "curable, aliphatic polyester", as used herein, is synonymous with the term "resin" and is intended to mean a thermosetting surface coating polymer prepared by the polycondensation of one or more acid components and hydroxyl components. The curable, aliphatic polyester of the present invention is a thermoset polymer and is suitable as a resin for solvent-based coatings and more specifically mono-coat applications. This polyester has a low molecular weight, typically 500 to 10,000 daltons, and would not be suitable for fabrication films, sheets, and other shaped objects by extrusion, casting, blow molding, and other thermoforming processes commonly used for high molecular weight thermoplastic polymers. The polyester has a reactive functional group, typically a hydroxyl group or carboxyl group for the purpose of later reacting with a crosslinker in a coating formulation. The functional group is controlled by having either excess diol or acid (from dicarboxylic acid or tricarboxylic acid) in the polyester resin composition. The desired crosslinking pathway will determine whether the polyester resin will be hydroxyl-terminated or carboxylic acid-terminated. This concept is known to those skilled in the art and described, for example, in *Organic Coatings Science and Technology*, 2nd ed., p. 246-257, by Z. Wicks, F. Jones, and S. Pappas, Wiley, New York, 1999, the entire disclosure of which is incorporated herein by reference.

Typically, the acid component comprises at least one dicarboxylic acid and may, optionally, include mono- and polybasic carboxylic acids. For example, the curable, aliphatic polyester may be prepared from an acid component comprising an aliphatic or cycloaliphatic dicarboxylic acid such as, for example, adipic acid or 1,3-cyclohexanedicarboxylic acid, or a mixture of one or more aliphatic and cycloaliphatic acids. The hydroxyl component comprises diols and polyols. The diols may comprise one or more cycloaliphatic diols such as, for example, 2,2,4,4-tetramethyl-1,3-cyclobutanediol, either alone or in combination with one or more linear or branched aliphatic diols such as, for example, neopentyl glycol. Catalysts may be used to accelerate the rate of the polycondensation reaction. Additional examples of acid components and hydroxyl components, other than TMCD of the curable, aliphatic polyester include those known in the art including, but not limited to, those discussed below, and in various documents known in the art such as, for example, in Resins for Surface Coatings, Vol. III, p. 63-167, ed. by P. K. T. Oldring and G. Hayward, SITA Technology, London, U K, 1987, the disclosure of which is incorporated herein by reference.

The term "residue", as used herein in reference to the polymers of the invention, means any organic structure incorporated into a polymer through a polycondensation or ring opening reaction involving the corresponding monomer. It will also be understood by persons having ordinary skill in the art, that the residues associated within the various curable polyesters of the invention can be derived from the parent monomer compound itself or any derivative of the parent compound. For example, the dicarboxylic acid residues referred to in the polymers of the invention may be derived from a dicarboxylic acid or its associated acid halides, esters, salts, anhydrides, or mixtures thereof. Thus, as used herein, the term "dicarboxylic acid" is intended to include dicarboxylic acids and any derivative of a dicarboxylic acid, including its associated acid halides, esters, half-esters, salts, half-salts, anhydrides, and mixtures thereof, useful in a polycondensation process with a diol to make a curable, aliphatic polyester.

The term "aliphatic" is intended to have its common meaning as would be understood by persons having ordinary skill in the art, that is, acyclic or cyclic, saturated or unsaturated carbon compounds, excluding benzenoid or other aromatic systems. The term "cycloaliphatic", as used herein, is intended to mean an aliphatic, cyclic compound. The term "aliphatic polyester", as used herein, is understood to mean a polyester that contains 90 mole percent or greater aliphatic diacid or diol residues, based on the total moles of diacid or diol residues. Small amounts, such as less than 10 mole %, or less than 9 mole %, or less than 8 mole %, or less than 5 mole %, or less than 3 mole %, or less than 2 mole %, or less than 1 mole % of aromatic dicarboxylic acids residues or aromatic diol residues also may be present in the curable, aliphatic polyester. Desirably, the curable, aliphatic polyester is essentially free, i.e., having less than 1 mole % of aromatic diacid and/or aromatic diol residues.

The term "carbamate" is intended to mean a functional group of an organic compound derived from carbamic acid (NH2COOH). Carbamate esters are also called urethanes.

In one embodiment of this invention a coating composition is provided comprising:
A. 50-95 weight percent, based on the total weight of (A) and (B), of at least one curable, aliphatic polyester, comprising residues of:
  i. A hydroxyl component, said hydroxyl component comprising the residues of:
    a. from 30 to 80 mole %, based on the total moles of (a) and (b), of 2,2,4,4-tetraalkylcyclobutane-1,3-diol (TACD);
    b. from 20 to 70 mole %, based on the total moles of (a) and (b), of other diols and polyols;
  ii. a diacid component, said diacid component comprising the residues of at least one aliphatic dicarboxylic acid comprising;
    c. 0 to 100 mole %, based on the total moles of the diacids (c) and (d), of an alicyclic dicarboxylic acid; and
    d. 0 to 100 mole %, based on the total moles of the diacids (c) and (d), of an acyclic aliphatic diacid;
B. from 5 to 50 weight percent, based on the total weight of (A) and (B) a melamine crosslinker; and
C. from 35 to 60 weight percent, based on the total weight of the coating composition, of organic solvents;
wherein the curable polyester has a hydroxyl number of 50 to 500 mgKOH/g of resin and an acid number of 0 to 200 mgKOH/g resin; and
wherein said cured coating fracture resistance is greater than or equal to 16 mN when tested using a Nano scratch tester with 2 μm Indenter per ASTM D7187-15.

The coating composition can also be blended with carbamate functional acrylic coatings to achieve improved Nano-scratch resistance and abrasion resistance.

TACD is a diol and can be represented by the general structure:

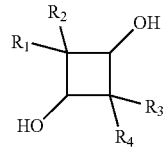

wherein R1, R2, R3, and R4 each independently represent an alkyl radical, for example, a lower alkyl radical having 1 to 8 carbon atoms; or 1 to 6 carbon atoms, or 1 to 5 carbon atoms, or 1 to 4 carbon atoms, or 1 to 3 carbon atoms, or 1 to 2 carbon atoms, or 1 carbon atom. The alkyl radicals may be linear, branched, or a combination of linear and branched alkyl radicals. Examples of TACD include 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethylcyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol. TMCD is most preferred.

The diols in (b) have 2 hydroxyl groups and can be branched or linear, saturated or unsaturated, aliphatic or cycloaliphatic C2-C20 compounds, the hydroxyl groups being primary, secondary, and/or tertiary, desirably primary. Examples of diols (b) include 2,2-dimethyl-1,3-propanediol (neopentyl glycol), 1,2 cyclohexane-dimethanol, 1,3-cyclohexanedimethanol, 1,4 cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, propylene glycol, diethylene glycol, dipropylene glycol, triethylene glycol, tetraethylene glycol, polyethylene glycol, and 2,2-bis(hydroxymethyl)propionic acid (dimethylolpropionic acid).

The diols (b) are 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, and 1,6-hexanediol or mixtures thereof. Desirably, at least one of the diols is neopentyl glycol.

The polyols in (b) have 3 or more hydroxyl groups and can be saturated or unsaturated, aliphatic or cycloaliphatic $C_2$-$C_{20}$ compounds, the hydroxyl groups being primary, secondary, and/or tertiary, and desirably at least two of the hydroxyl groups are primary. Desirably, the polyols are hydrocarbons and do not contain atoms other than hydrogen, carbon and oxygen. Examples of the polyol include 1,1,1-trimethylolpropane (TMP), 1,1,1-trimethylolethane, glycerin, pentaerythritol, erythritol, threitol, di-pentaerythritol, sorbitol, mixtures thereof, and the like. Desirably, the polyol is TMP.

The alicyclic diacid in ii (c) is a cyclic aliphatic dicarboxylic acid compound, its diester derivative, its anhydride, or a combination thereof. Suitable alicyclic diacid compounds include compounds having two carboxylic acid groups, their diester derivatives, and their anhydrides. The dicarboxylic acid compounds can form ester linkages with diol or polyol compounds. For example, a polyester can be synthesized by using a polyhydroxyl compound and a derivative of a dicarboxylic acid such as, for example, dimethyl ester or other dialkyl esters of the diacid, or diacid chloride or other diacid halides, or acid anhydride.

Suitable alicyclic diacids include, but are not limited to, 1,4 cyclohexanedicarboxylic acid, 1,3 cyclohexanedicarboxylic acid, hexahydrophthalic anhydride (HHPA), methyl hexahydrophthalic anhydride, tetrahydrophthalic anhydride, tetrachlorophthalic anhydride, 5-norbornene-2,3-dicarboxylic anhydride, 5-norbornene-2,3-dicarboxylic acid, 2,3-norbornanedicarboxylic acid, 2,3-norbornanedicarboxylic acid anhydride, and mixtures thereof. HHPA is the most desired alicyclic diacid.

The acyclic aliphatic diacid in ii(d) is an open-chain aliphatic dicarboxylic acid compound, its diester derivative, its anhydride, or a combination thereof. Examples of acyclic aliphatic diacids include succinic acid, adipic acid, maleic anhydride, maleic acid, fumaric acid, itaconic anhydride, itaconic acid, citraconic anhydride, citraconic acid, dodecanedioic acid, sebacic acid, azelaic acid, and the like. Adipic acid is most preferred.

The aliphatic dicarboxylic acid (ii) comprises from 0 to 100 mole %, based on the total moles of the diacids (c) and (d), of an alicyclic dicarboxylic acid and 0 to 100 mole %, based on the total moles of the diacids, (c) and (d), of an acyclic aliphatic diacid.

The hydroxyl number of the curable polyester A of the present invention is from about 50 to about 500, from about 150 to about 350 mgKOH/g. The acid number is from 0 to about 100, from about 2 to about 50, from 2 to about 15, or from 2 to about 10 mg KOH/g.

The number average molecular weight (Mn) of the curable polyester A of the present invention may be from 500 to 10,000, from 750 to 5,000, or from 1,000 to 2,500 g/mole. The weight average molecular weight (Mw) of the curable polyester of the present invention may be from 1,000 to 10,000, from 1,500 to 6,000, or from 2,000 to 4,000 g/mole. Molecular weights are measured by gel permeation chromatography (GPC) using polystyrene equivalent molecular weight.

The glass transition temperature (Tg) of the curable polyester A of the present invention may be from minus 45° C. to 55° C., from minus 40° C. to 45° C., or from minus 35° C. to 40° C.

The crosslinker desirably is an alkylated melamine-formaldehyde liquid composition. Suitable melamines include, but are not limited to, partially alkylated or fully alkylated melamine such as the crosslinker used in this study.

Stoichiometric calculations for the polyester resin and melamine reaction are known to those skilled in the art and are described in The Chemistry of Coatings, Technical Publication p. 20, by Bayer Material Science, 2005, incorporated herein by reference. Theoretically, crosslinking between the polyester resin and the melamine reaches maximum molecular weight and optimal properties associated with molecular weight when one equivalent of melamine (—OR) reacts with one equivalent of hydroxyl (OH), which is when the (—OR) to OH ratio is 1.0/1.0.

In another aspect, this invention further provides a curable coating composition further comprising one or more crosslinking catalysts. Useful acid catalysts may include DDBSA, pTSA and the like either blocked or unblocked by an amine. Useful amounts of catalyst will be about 0.01 to 5%, based on the total weight of the resin solids.

Additional additives that may be included in the composition described herein include UV inhibitors, wetting agents, flow agents, rheology control agents, anti-settling, anti-sag agents and slip agents.

Some examples of UV absorbers and UV light stabilizers are substituted benzophenone, substituted benzotriazoles, hindered amines, and hindered benzoates, available from Cytec Specialty Chemicals as CYASORB® UV, and available from Ciba Specialty Chemicals as TINUVIN®; diethyl-3acetyl-4-hydroxy-benzyl-phosphonate, 4-dodecyloxy-2-hydroxy benzophenone, and resorcinol monobenzoate.

Any solvent that will enable the formulation to be coated on a substrate may be used, and these will be well known to the person skilled in the art. Suitable organic solvents include glycols, glycol ether alcohols, alcohols, ketones, and aromatics, such as xylene and toluene, acetates, mineral spirits, naphthas and/or mixtures thereof. "Acetates" include the glycol ether acetates. The amount of organic solvent can be up to 60 wt. % based on the total weight of the coating composition.

The substrate to which this inventive coating may be applied may include any common substrate such as paper; polymer films such as polyethylene or polypropylene; wood; metals such as aluminum, steel or galvanized sheeting; glass; urethane elastomers; primed (painted) substrates; and the like. The coating composition can be coated onto a substrate using techniques known in the art, for example, by spraying, draw-down, roll-coating, etc., to form a dried coating having a thickness of about 0.1 to about 4 mils (1 mil=25 μm), or 0.5 to 3, or 0.5 to 2, or 0.5 to 1 mils on the substrate. The coating can be cured at a temperature of about 50° C. to about 200° C., for a period that typically ranges about 10 to about 90 minutes and allowed to cool.

The coating composition in this invention report is particularly well suited for automotive OEM (Original Equipment Manufacturer) clearcoat applications. Current commercial carbamate technology has taken automotive finishes to its current leading level of acid etch resistance in the polyol/melamine technology. The addition of the described clearcoat based on this TACD chemistry can greatly improve 1K carbamate clearcoat scratch resistance in automotive finishes.

The addition of the above clearcoat to an automotive carbamate clearcoat will increase the scratch resistance of the clearcoat while maintaining or improving the clearcoat acid etch resistance. Representative clearcoats with carbamate functionality include those currently used automotive assembly plants

EXAMPLES

The present invention is illustrated in greater detail by the specific examples presented below. It is to be understood that these examples are illustrative embodiments and are not intended to be limiting of the invention, but rather are to be construed broadly within the scope and content of the appended claims. All parts and percentages in the examples are on a weight basis unless otherwise stated.

Preparation of Curable Polyesters

The example polyester resins (Table 1) were prepared according to the following procedures. All resins were prepared in a two-liter reaction kettle equipped with a heating mantle, mechanical stirrer, thermocouple, nitrogen blanket, oil-heated partial condenser, condensate trap, and water-cooled total condenser.

Example Polyester 1 (PE 1)

Stage 1—HHPA, TMCD, TMP (half of total), AD, triphenylphosphite and xylene were charged to the reaction kettle. Additional xylene was used to fill the condensate trap. The temperature was then increased from room temperature to 170° C. over two hours. Agitation was started when the melt reached 75° C. The reaction was held for 60 min. at 170° C. The temperature was increased to 220° C. over 50 minutes and held until 37 g of the water of esterification was obtained. The reaction was then cooled to 170° C.

Stage 2—NPG, TMP (second half) and catalyst were added to the reactor. It was then heated to 230° C. over two hours. The reaction was held at 230° C. until a final acid number of 5-10 mg KOH/g resin was achieved. The resin was cooled to 110° C. and adjusted to 75 weight percent solids with n-butyl acetate. It was then poured through a medium mesh paint filter into a metal paint can.

Example Polyester 2 (PE 2)

Stage 1—HHPA, TMCD, triphenylphosphite and xylene were charged to the reaction kettle. Additional xylene was used to fill the condensate trap. The temperature was increased from room temperature to 130° C., over one hour and forty five minutes. Agitation was started when the melt reached 100° C. The temperature was held at 130° C. until an acid number≤248 mg KOH/g resin was achieved.

Stage 2—TMP (including excess) and catalyst were added to the reactor and heated to 230° C., over four hours. The reaction was held at 230° C. until a final acid number of 2 mg KOH/g resin was achieved. The resin was cooled to 110° C. and adjusted to 75 weight percent solids with n-butyl acetate. It was then poured through a medium mesh paint filter into a metal paint can.

Example Polyester 3 (PE 3)

Stage 1—NPG, TMCD, TMP (half of total), AD, triphenylphosphite, catalyst and xylene were charged to the reaction kettle. Additional xylene was used to fill the condensate trap. The temperature was then increased from room temperature to 170° C., over two hours and forty five minutes. Agitation was started when the melt reached 150° C. The temperature was increased to 220° C., over two hours and held until half of the water of esterification (122.44 g) was obtained.

Stage 2—TMP (second half) was added to the reactor and held at 220° C. until a final acid number of 4-8 mg KOH/g resin was achieved. The resin was cooled to 110° C. and adjusted to 75 weight percent solids with n-butyl acetate. It was then poured through a medium mesh paint filter into a metal paint can.

Example Polyester 4 (PE 4)

Stage 1—TMCD, TMP (half of total), DDDA, triphenylphosphite, catalyst and xylene were charged to the reaction kettle. Additional xylene was used to fill the condensate trap. The temperature was then increased from room temperature to 170° C., over two hours and forty-five minutes. Agitation was started when the melt reached 150° C. The temperature was increased to 220° C., over two hours and held until half of the water of esterification (84.56 g) was obtained.

Stage 2—TMP (second half) was added to the reactor and held at 220° C. until a final acid number of 4-8 mg KOH/g resin, was achieved. The resin was cooled to 110° C. and adjusted to 75 weight percent solids with n-butyl acetate. It was then poured through a medium mesh paint filter into a metal paint can.

Example Polyester 5 (PE 5)

Stage 1—HHPA, TMCD, TMP (half of total), AD, triphenylphosphite, catalyst and xylene were charged to the reaction kettle. Additional xylene was used to fill the condensate trap. The temperature was then increased from room temperature to 170° C., over one hour and forty-five minutes. Agitation was started when the melt reached 130° C. The temperature was increased to 200° C., over one hour and held until an acid number 214 mg KOH/g resin was achieved. The temperature was then cooled to 185° C.

Stage 2—NPG and TMP (second half) were added to the reactor and heated to 230° C., over two hours and fifteen minutes. The reaction was held at 230° C. until a final acid number of 5-8 mg KOH/g resin, was achieved. The resin was cooled to 110° C. and adjusted to 75 weight percent solids with n-butyl acetate. It was then poured through a medium mesh paint filter into a metal paint can.

Resin Properties

The acid number (abbreviated "AN"), hydroxyl number (abbreviated "OHN"), number average molecular weight (abbreviated "Mn"), weight average molecular weight (abbreviated "Mw"), molecular weight distribution polydispersity index (abbreviated "Mw/Mn"), and glass transition temperature (abbreviated "Tg") of the polyesters are shown in Tables 1 and 2.

Acid number was determined using ASTM method D 1639.

Hydroxyl number was determined by esterifying the resin by reaction with excess acetic anhydride in pyridine and then decomposing the unreacted anhydride with water. The resulting acetic acid is then titrated with a standard solution of KOH. The number of milligrams KOH which are equivalent to one gram of resin sample is reported as the hydroxyl number.

Molecular weight was determined by gel permeation chromatography using a refractive index detector with polystyrene standards.

Residual solvent remaining in the resin from solvent processing could artificially lower the Tg measurement. To obtain a more accurate Tg, a resin sample was first subjected to preconditioning in an oven. About 0.3 g of the resin was placed into a small aluminum weighing pan and heated for one hour at 110° C. A sample was then transferred to a differential scanning calorimeter (TA Instruments DSC Q2000 V24.9 Build 121). On the first heating cycle, the sample was heated under nitrogen atmosphere from −50° C. to 140° C. at a rate of 20° C./min. The sample was then quench cooled to −50° C. For the second heating cycle, the sample was heated under the same conditions as those used in the first heating cycle. The midpoint of the second heating cycle is reported as the Tg of the sample.

TABLE 1

Example Polyester Resin Charge Weights (Grams) and Determined Resin Properties

| Polyester Resin | Example PE 1 | Example PE 2 | Example PE 3 | Example PE 4 | Example PE 5 |
|---|---|---|---|---|---|
| Stage 1 | | | | | |
| TMCD[a] | 223.35 | 379.03 | 357.43 | 522.60 | 322.35 |
| NPG[b] | — | — | 258.14 | — | — |
| TMP[c] | 106.63 | — | 205.96 | 182.32 | 171.50 |
| HHPA[d] | 520.01 | 810.36 | — | — | 336.22 |
| AD[e] | 265.42 | — | 1017.39 | — | 677.26 |
| DDDA[h] | — | — | — | 1081.87 | — |
| Fascat 4100 catalyst[f] | — | — | 0.51 | 0.49 | 1.00 |
| Triphenylphosphite | 1.52 | 1.89 | 2.04 | 0.98 | 2.00 |
| Xylene process solvent | 15.22 | 47.37 | 51.12 | 49.23 | 50.01 |
| Stage 2 | | | | | |
| NPG[b] | 299.57 | — | — | — | 321.49 |
| TMP[c] | 106.63 | 705.23[g] | 205.96 | 182.32 | 171.50 |
| Fascat 4100 catalyst[f] | 1.52 | 1.89 | — | — | — |
| Total Charge (solids only) | 1523.13 | 1898.40 | 2047.42 | 1970.58 | 2003.32 |
| Minus Theo. Condensate | 121.61 | 94.62 | 244.87 | 169.11 | 200.32 |
| Yield (solids only) | 1403.04 | 1803.78 | 1802.55 | 1801.47 | 1803.00 |
| Determined Resin Properties | | | | | |
| AN, mg KOH/g resin | 10 | 2 | 8 | 5 | 8 |
| OHN, mg KOH/g resin | 131 | 304 | 158 | 176 | 144 |
| $M_w$ | 6457 | 1988 | 31397 | 12652 | 10388 |
| $M_n$ | 1542 | 1016 | 2315 | 2690 | 2047 |
| $M_w/M_n$ | 4.19 | 1.96 | 13.56 | 4.70 | 5.08 |
| $T_g$, °C. | 9 | 17 | −31 | −41 | −16 |

[a] 2,2,4,4-tetramethyl-1,3-cyclobutanediol (Eastman)
[b] 2,2-Dimethyl-1,3-propanediol (Eastman)
[c] Trimethylolpropane (Perstorp)
[d] Hexahydrophthalic anhydride (Dixie Chemical)
[e] Adipic acid (Ascend)
[f] Butylstannoic acid (PMC Organometallix)
[g] Add 1 wt. % glycol excess based on charge weight
[h] Dodecandioic acid Preparation of 1K Clearcoats 1K clearcoats were prepared by mixing the ingredients listed in Table 2. The clears were adjusted with n-butyl acetate to a viscosity of 28 seconds as measured using a #4 DIN cup.

TABLE 2

Example Clearcoat Weights (Grams)

| Clearcoat | Example CC 1 | Example CC 2 | Example CC 3 | Example CC 4 | Example CC 5 |
|---|---|---|---|---|---|
| Example PE1 | 52.9 | | | | |
| Example PE2 | | 38.4 | | | |
| Example PE3 | | | 53.7 | | |
| Example PE4 | | | | 50.7 | |
| Example PE5 | | | | | 53.2 |
| Cymel 303 | 11.5 | 24.7 | 11.7 | 16.5 | 11.5 |
| Nacure 5076 | 0.6 | 0.5 | 0.5 | 0.5 | 0.5 |
| Byk 306 | 0.03 | 0.03 | 0.03 | 0.03 | 0.03 |
| Byk 331 | 0.03 | 0.03 | 0.03 | 0.03 | 0.03 |
| Tinuvin 1130 | 0.5 | 0.5 | 0.5 | 0.5 | 0.5 |
| Tinuvin 123 | 1.0 | 1.0 | 1.0 | 1.0 | 1.0 |
| Solvent blend** | 33.7 | 35.0 | 33.0 | 31.0 | 33.7 |
| Total | 100 | 100 | 100 | 100 | 100 |

**Solvent blend =

CYMEL 303 is a methylated, monomeric malamine crosslinker available commercially from Allnex. NACURE 5076 is a acid catalyst based on Dodecylbenzenesulfonic acid available commercially from King Industries. BYK 306 is a solution of a polyether modified polydimethylsiloxane available commercially from BYK-CHEMIE GMBH. BYK 331 is a silicone additive available commercially from BYK-CHEMIE GMBH. TINUVIN 1130 is a liquid UV absorber available commercially from BASF. TINUVIN 123 light stabilizer available commercially from BASF. Solvent blend** is n-butyl acetate, ethylene glycol monopropyl ether, SOLVESSO 100 available from ExxonMobile blendeded in a 1/1/1 ratio by weight.

The five clearcoats in Table 2 were then combined with a commercially available 1K carbamate clearcoat (Comparative CC Example 1) in the ratios shown in Table 3. Panels were coated with electrodeposition primer ED7000 from PPG and primer surfaced with a commercial automotive primer, then coated with a commercial waterborne black basecoat and baked enough for dehydration of the basecoat before applying the experimental clearcoats. Coated panels were flashed 10 minutes at room temperature and then cured at 140° C. for 30 minutes.

Testing of 1K Clearcoats

The clearcoats were evaluated for scratch resistance and acid etch resistance.

Resistance of the clearcoat to scratches was determined by measuring gloss retention after abrasian by crockmeter and fracture resistance by nanoindentation. An AATCC Model CM-5 Crockmeter (ASTM 6279) equipped with a 10N load and 9 micron 3M paper was used to scratch the surface of the clearcoat. The disc diameter was 16 millimeters and stroke length was 10 centimeters. The 20° gloss of the clearcoat was measured before scratching the surface. The clearcoat was then scratched by 10 double rubs of the Crockmeter. Three gloss readings were then taken after scratching and averaged. The percent gloss retention is reported in Table 3. The nanoscratch test was performed using a Bruker Hysitron TI 980 Triboindenter, a nanomechanical test instrument for quantifying scratch resistance. The instrument parameters for determining the fracture resistance (Table 3) of the clearcoats were as follows:

| Parameters | Nano scratch |
| --- | --- |
| Indenter Type | Diamond 90° conical |
| Indenter Radius | 2 μm |
| Begin Load | 0.1 mN |
| End Load | 40 mN |
| Scratch Length | 3 mm |
| Scratch Velocity | 3.0 mm/min |
| Loading Rate | 40.0 mN/min |

Acid etch resistance was determined using an Erichsen Model 432 gradient oven. The temperature range was set from 30° C. to 70° C. The testing was done according to DIN EN ISO 2812-5:2007-05. The last temperature on the gradient scale that did not etch the clearcoat where the sulfuric acid reagent was applied is reported (Table 3).

The clearcoats that do not contain carbamate-functional resins (Example Clearcoats 1, 2, 3, 4 and 5), i.e. hydroxyl-functional polyesters, have a better combination of scratch resistance (gloss retention after Crockmeter abrasion, fracture resistance) and acid etch resistance than the commercial 1K carbamate clearcoat. Furthermore, combining the clearcoats that do not contain a carbamate-functional resin with the commercial 1K carbamate clearcoat significantly improved its Crockmeter abrasian, fracture resistance and maintained or improved acid etch resistance as shown in Table 3.

TABLE 3

Scratch and Chemical Resistance of Clearcoats

| Clearcoat Example | Comparative CC 1 | Example CC 6 | Example CC 7 | Example CC 1 | Example CC 8 | Example CC 9 | Example CC 2 | Example CC 10 | Example CC 11 |
| --- | --- | --- | --- | --- | --- | --- | --- | --- | --- |
| Ratio Comparative/Example Clearcoat | | | | | | | | | |
| Comparative Clearcoat 1 | 100 | 75 | 50 | 0 | 75 | 50 | 0 | 75 | 50 |
| Example 1 Clearcoat | 0 | 25 | 50 | 100 | 0 | 0 | 0 | 0 | 0 |
| Example 2 Clearcoat | 0 | 0 | 0 | 0 | 25 | 50 | 100 | 0 | 0 |
| Example 3 Clearcoat | 0 | 0 | 0 | 0 | 0 | 0 | 0 | 25 | 50 |
| Example 4 Clearcoat | 0 | 0 | 0 | 0 | 0 | 0 | 0 | 0 | 0 |
| Example 5 Clearcoat | 0 | 0 | 0 | 0 | 0 | 0 | 0 | 0 | 0 |
| Scratch resistance | | | | | | | | | |
| Crockmeter. % gloss retention | 68 | 82 | 76 | 66 | 79 | 90 | 85 | 85 | 94 |
| Fracture resistance, mN | 14 | 20 | 24 | 22 | 16 | 16 | 27 | 25 | >40 |
| Chemical Resistance (° C.) | | | | | | | | | |
| H$_2$SO$_4$ | 36 | 41 | 42 | 42 | 39 | 36 | 40 | 39 | 37 |

| Clearcoat Example | Example CC 3 | Example CC 12 | Example CC 13 | Example CC 4 | Example CC 14 | Example CC 15 | Example CC 5 |
| --- | --- | --- | --- | --- | --- | --- | --- |
| Ratio Comparative/Example Clearcoat | | | | | | | |
| Comparative Clearcoat 1 | 0 | 75 | 50 | 0 | 75 | 50 | 0 |
| Example 1 Clearcoat | 0 | 0 | 0 | 0 | 0 | 0 | 0 |
| Example 2 Clearcoat | 0 | 0 | 0 | 0 | 0 | 0 | 0 |
| Example 3 Clearcoat | 100 | 0 | 0 | 0 | 0 | 0 | 0 |
| Example 4 Clearcoat | 0 | 25 | 50 | 100 | 0 | 0 | 0 |
| Example 5 Clearcoat | 0 | 0 | 0 | 0 | 25 | 50 | 100 |
| Scratch resistance | | | | | | | |
| Crockmeter. % gloss retention | 98 | 81 | 88 | 99 | 75 | 71 | 87 |
| Fracture resistance, mN | >40 | 26 | >40 | >40 | 24 | 30 | >40 |
| Chemical Resistance (° C.) | | | | | | | |
| H$_2$SO$_4$ | 40 | 38 | 36 | 34 | 42 | 40 | 38 |

The blend ratio of polyester clear coats of this invention to carbamate functional clear coats to achieve improved Crockmeter abrasian, fracture resistance and maintained or improved acid etch resistance is from about 10:90, from about 25:75, from about 50:50, from about 75:25 or from about 90:10 on a parts-by-weight basis.

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention.

We claim:

1. A clear coating composition comprising:
   A. 50-95 weight percent, based on the total weight of (A) and (B), of at least one curable, aliphatic polyester, comprising residues of:
      i. A hydroxyl component, said hydroxyl component comprising the residues of:
         a. from 30 to 80 mole %, based on the total moles of (a) and (b), of 2,2,4,4-tetraalkylcyclobutane-1,3-diol (TACD);
         b. from 20 to 70 mole %, based on the total moles of (a) and (b), of diols and polyols other than TACD; and
      ii. a diacid component, said diacid component comprising the residues of at least one aliphatic dicarboxylic acid comprising;
         c. 0 to 100 mole %, based on the total moles of the diacids (c) and (d) of an alicyclic dicarboxylic acid; and
         d. 0 to 100 mole %, based on the total moles of the diacids (c) and (d), of an acyclic aliphatic diacid; and
   B. from 5-50 weight percent, based on the total weight of (A) and (B) a melamine crosslinker;
   wherein the curable polyester has a hydroxyl number of 50 to 500 mgKOH/g of resin, a number average molecular weight of 500 to 10,000, a Tg of −45° C. to −12.5° C., and an acid number of 0 to 20 mgKOH/g resin.

2. The composition of claim 1 wherein said 2,2,4,4-tetraalkylcyclobutane-1,3-diol (TACD) is a diol represented by the general structure:

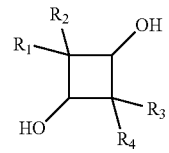

wherein R1, R2, R3, and R4 are each independently an alkyl radical, having 1 to 8 carbon atoms.

3. The composition of claim 1 wherein said 2,2,4,4-tetraalkylcyclobutane-1,3-diol is selected from the group consisting of 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, 2,2,4,4-tetra-n-butylcyclobutane-1,3-diol, 2,2,4,4-tetra-n-pentylcyclobutane-1,3-diol, 2,2,4,4-tetra-n-hexylcyclobutane-1,3-diol, 2,2,4,4-tetra-n-heptylcyclobutane-1,3-diol, 2,2,4,4-tetra-n-octylcyclobutane-1,3-diol, 2,2-dimethyl-4,4-diethylcyclobutane-1,3-diol, 2-ethyl-2,4,4-trimethylcyclobutane-1,3-diol, 2,4-dimethyl-2,4-diethyl-cyclobutane-1,3-diol, 2,4-dimethyl-2,4-di-n-propylcyclobutane-1,3-diol, 2,4-n-dibutyl-2,4-diethylcyclobutane-1,3-diol, 2,4-dimethyl-2,4-diisobutylcyclobutane-1,3-diol, and 2,4-diethyl-2,4-diisoamylcyclobutane-1,3-diol.

4. The composition of claim 1 wherein said diols and polyols other than TACD (b) are selected from the group consisting of 2,2-dimethyl-1,3-propanediol (neopentyl glycol), 1,2-cyclohexane dimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, ethylene glycol, propylene glycol, diethylene glycol, dipropylene glycol, triethylene glycol, tetraethylene glycol, polyethylene glycol, 2,2-bis(hydroxymethyl) propionic acid (dimethylolpropionic acid), 1,1,1-trimethylolpropane (TMP), 1,1,1-trimethylolethane, glycerin, pentaerythritol, erythritol, threitol, di-pentaerythritol, and sorbitol.

5. The composition of claim 1 wherein said alicyclic diacid component is selected from the group consisting of 1,4-cyclohexanedicarboxylic acid, 1,3-cyclohexanedicarboxylic acid, hexahydrophthalic anhydride (HHPA), methyl hexahydrophthalic anhydride, tetrahydrophthalic anhydride, 5-norbornene-2,3-dicarboxylic anhydride, 5-norbornene-2,3-dicarboxylic acid, 2,3-norbornane-dicarboxylic acid, 2,3-norbornane-dicarboxylic acid anhydride, and mixtures thereof.

6. The composition of claim 1 wherein said acyclic aliphatic diacid is selected from the group consisting of succinic acid, adipic acid, maleic acid, fumaric acid, itaconic acid, citraconic acid, dodecanedioic acid, sebacic acid, and azelaic acid.

* * * * *